United States Patent [19]

Bunker

[11] 4,043,000
[45] Aug. 23, 1977

[54] KNEE JOINT COUPLING

[75] Inventor: James W. Bunker, Saugus, Calif.

[73] Assignee: Hi-Shear Corporation, Torrance, Calif.

[21] Appl. No.: 695,574

[22] Filed: June 14, 1976

[51] Int. Cl.² .............................................. E05D 9/00
[52] U.S. Cl. ................................... 16/128 R; 16/171; 16/149; 16/170
[58] Field of Search ............... 403/157, 152, 159, 119; 16/128 R, 149, 171, 170, 173, 163, 168; 223/66, 68; 3/12, 22; 128/80 F

[56] References Cited

U.S. PATENT DOCUMENTS

| | | | |
|---|---|---|---|
| 2,963,734 | 12/1960 | Huget | 16/171 |
| 3,371,506 | 3/1968 | Zahn | 16/171 X |
| 3,837,044 | 9/1974 | Goetz et al. | 16/149 X |

Primary Examiner—G. V. Larkin

Attorney, Agent, or Firm—D. Gordon Angus; Donald D. Mon

[57] ABSTRACT

A knee joint coupling comprises a pair of similar U-shaped links each having a base and two parallel legs extending perpendicularly from the base. One of the legs of each link has a hole through it and the other leg has a pin extending from it in the direction either toward or away from the hole. When the pin of each link is fitted into the hole of the other link, there is assembled a knee-joint type of coupling due to the pivoting action of the pins in the holes. The links may be held assembled by means such as screw members inserted through the bases and into the region between the legs of the two links. Alternatively one of the links may have its base fixed to one member while the other link is fixed to the other member in which case the two members are pivotable as a door hinge or the like relative to each other.

5 Claims, 12 Drawing Figures

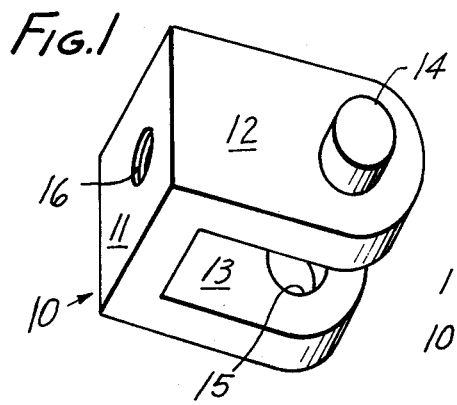
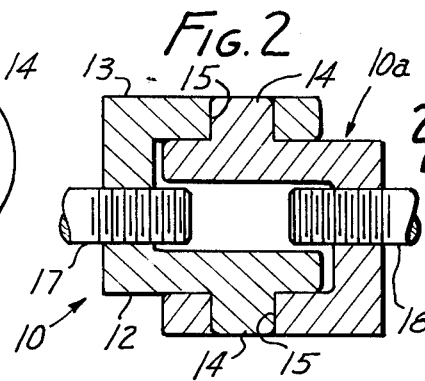
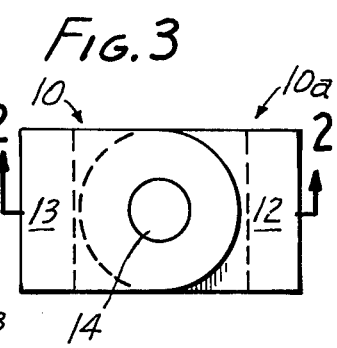
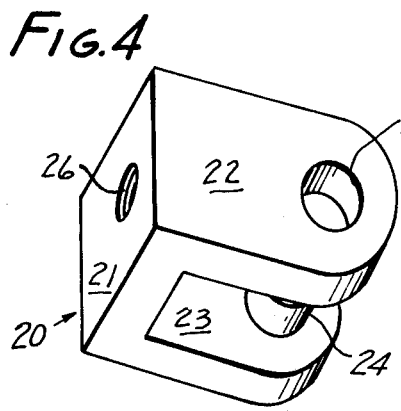
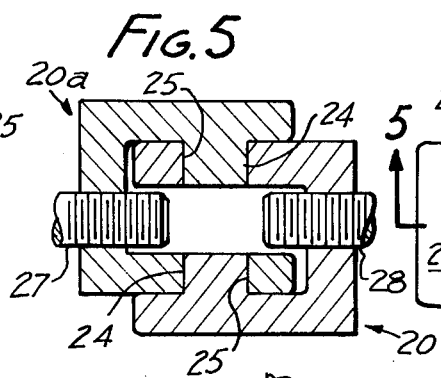
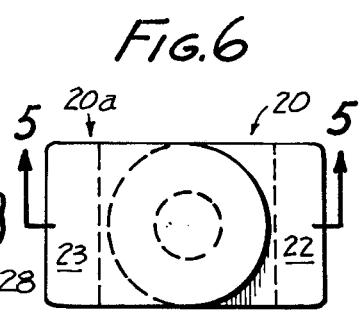
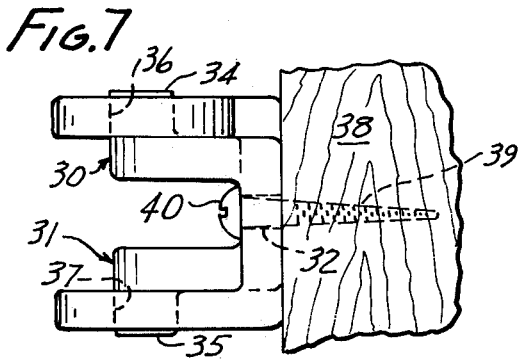
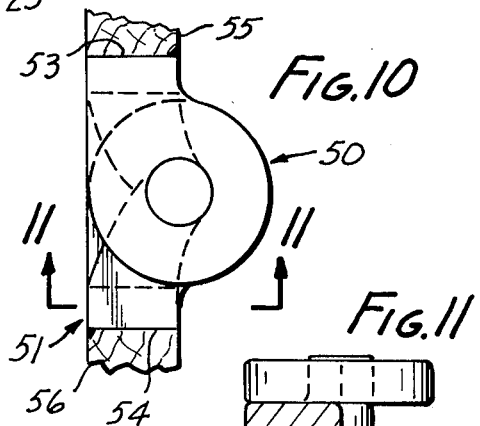
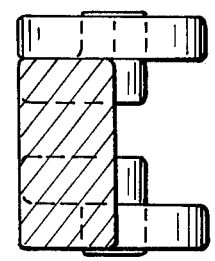
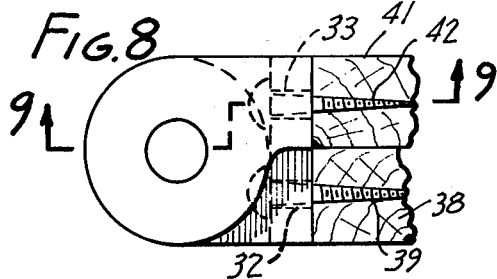

KNEE JOINT COUPLING

This invention relates to knee-joint type couplings which permit two members to be coupled in a pivotal manner as in the case of a door hinge or drop leaf table or the like. An object is to provide a relatively simple and inexpensive type of pivotal coupling means.

Pivotal coupling devices are well known, for example door hinges and other hinges which permit two members to be coupled in a manner to pivot relative to each other. Well-known door hinges commonly comprise two members each of which is adapted to be fastened to one of the two members to be pivoted. A common hinge pin serves to couple the hinge members together.

In accordance with the present invention all that is required is to produce two link members which can be interlocked with each other. Each of the similar hinge members comprises a link having a base and two spaced legs outstanding from the base. One of the legs of each link has a hole and the other leg has a pin protruding from the link, the hole and the link being aligned. The pin from each link may be made to protrude outwardly from the link leg or alternatively may protrude inwardly toward the opposite leg. The coupling is assembled by inserting the pin of each of the two links into the hole of the other link.

The assembled pair of links may be secured against disassembly in any suitable manner, as for example by attaching each link to one of a pair of exterior members. Alternatively a hole may be formed through the base of each link so that a screw or shaft may be inserted through the hole. If the screw or shaft be made to protrude inwardly into the space between adjacent legs of the two respective links the assembly will thereby be maintained.

The foregoing and other features of the invention will be better understood from the following detailed description and the accompanying drawings, of which:

FIG. 1 is a perspective view of a link for a coupling according to this invention;

FIG. 2 is a cross-section view taken at line 2—2 of FIG. 3 showing the assembly of two links like that of FIG. 1, secured by threaded rods or shafts;

FIG. 3 is a top view of the assembly of FIG. 2;

FIG. 4 is a perspective view of an alternate form of link which may be used for a coupling according to this invention;

FIG. 5 is a cross-section view taken at line 5—5 of FIG. 6 showing the assembly of two links according to FIG. 4 secured by threaded rods or shafts;

FIG. 6 is a top view of the assembly of FIG. 5;

FIG. 7 shows an assembly of two links somewhat similar to that shown in FIG. 1, secured to external members by screws, as a hinge arrangement;

FIG. 8 shows a top view of the structure of FIG. 7;

FIG. 9 is a cross-section view taken at line 9—9 of FIG. 8;

FIG. 10 shows a modified form of hinge arrangement according to this invention;

FIG. 11 is a cross-section view taken at line 11—11 of FIG. 10; and

FIG. 12 shows a modified form of link according to this invention.

Referring to FIGS. 1, 2 and 3, FIG. 1 shows a link for a knee-joint coupling, in the form of a rigid U-shaped member 10 having a flat base 11 from which there extend an upper leg 12 and a lower leg 13, perpendicular to the base and parallel with, and spaced from, each other, so as to leave a space between the two legs. A pin 14 protrudes outwardly from the upper leg at some distance from the base 11, and directly opposite the pin 14 there is a hole 15 through the lower leg 13 so that the pin and the hole are coaxial. The hole 15 is of the proper diameter such that it will accommodate a pin 14 of another identical link. There is formed through base 11 a threaded hole 16 which is located closer to leg 12 having the pin, than to leg 13 having the hole 15.

FIG. 2 shows in cross-section an assembly of link 10 with a second identical link 10a forming a knee-joint coupling, the two links being assembled by the insertion of the pin 14 of link 10a into the hole 15 of link 10, from inside link 10, and similarly inserting the pin 14 of the link 10 into the hole 15 of link 10a from inside link 10a. The two pins are coaxial. The link assembly shown in FIG. 2 serves as a coupling joint between two shafts or rods or screw members 17 and 18, and moreover it serves as a knee joint inasmuch as the pins may swivel within the holes 15 of the links. Shaft 17 is threaded through the hole 16 of base 11 of link 10 from the exterior of the link into the interior for such a distance that it overlaps the end part of upper leg 12 of link 10a. Similarly threaded shaft or rod or screw member 18 is threaded from outside link 10a through the hole 16 of link 10a and into the interior for a distance such that the end of the shaft overlaps the end of lower leg 13 of link 10. These inner ends of shafts 17 and 18 hold the assembly together. By making the clearance of the inner ends of the shafts from the inner ends of the respective legs of the two links small, the pins can be maintained in their respective holes without excessive looseness.

FIGS. 4, 5 and 6 illustrate an alternate form of knee joint coupling which differs from the arrangement shown in FIGS. 1, 2 and 3 in that the pins protrude inwardly at the joint instead of outwardly. FIG. 4 shows one of the links 20 having a base 21, an upper leg 22 and a lower leg 23 which are similar to the parts 11, 12 and 13 respectively of FIG. 1 except that the lower leg 23 is provided with a pin 24 which protrudes inwardly toward the hole 25 through the upper leg 22. Base 21 is provided with a threaded hole 26 the same as hole 16 of FIG. 1, but in the link oF FIG. 4 the hole 26 is located closer to the leg 22 having the hole 25 than to the leg 23 having the pin 24. In FIG. 5 two identical links 20 and 20a are brought together with the pin 24 of link 20 through the hole 25 of link 20a and with the pin 24 of link 20a through hole 25 of link 20. Shafts 27 and 28 are threaded through the respective holes 26 of the two links so that the inner ends of the two shafts protrude far enough into the space between the links to maintain the links assembled. The pins 24 of the two links are coaxial with each other and with the holes 25 so that they pivot in a manner similar to that shown in FIG. 2.

FIGS. 7, 8 and 9 show a knee joint arranged as a hinge such as for a door, shelf, table leaf or the like. Two identical links 30 and 31 are assembled. Each of these links is similar to link 10 of FIG. 1 except that the holes 32 and 33 through the base need not be threaded where fasteners not to be threaded through the holes are used. The outwardly extending pins 34 and 35 from legs of the respective links 30 and 31 are inserted through the respective holes 36 and 37 of the opposite legs. The link 30 is attached to an external member 38 shown as made of wood (although it may be of other material), by means of a wood screw 39 passed through the base hole 32 and into the member 38 so that the head 40 of the screw holds the link to the member. The other link 31 is similarly fastened to another external member 41 by means of another wood screw 42. As an example, one of the members 38 or 41 may be a door, while the other may be a door jamb; or in the case of a table or shelf one of the members 38 or 41 may be a table or other similar member while the other of the members 38 and 41 may be a table leaf or shelf or the like.

FIGS. 10 and 11 show two a knee-joint coupling comprising links 50 and 51 coupled together as a hinge. These two links are similar to links 30 and 31 as shown in FIG. 7, except that there is no need for holes in their base such as holes 32 and 33 shown in FIGS. 7 through 9. Hence there will be no bolt or screw through the base. Instead the bases 53 and 54 of these links 50 and 51 will be attached to outside members 55 and 56 in some other manner, as for example adhesive.

FIG. 12 illustrates a form which a link may take if it is to be made by stamping or bending or molding. Here the link 60 has an outwardly protruding pin 61 and its side 62 which is located at the end of this side 62 remote from the base 63. The other side 64 is dimensioned so that its hole 65 is on the same central axis as that of pin 61. The hole 66 through the base or may not be threaded depending on the use to which the link is to be put. The link may be made as a flat piece by a stamping process with the pin 61 extruded. The flat piece may then be bent to form sides 62 and 64 and the base 63 as illustrated in FIG. 12. The stamping and bending processes may be eliminated by producing the link by a double die mold in one step.

This invention is not to be limited by the embodiments shown in the drawings and described in the description, which are given by way of example and not of limitation, but only in accordance with the scope of the appended claims.

I claim:
1. A knee joint coupling comprising:
a first link and a second link;
each of said links having:
a base;
two legs extending from the base providing space therebetween;
a pin protruding from a first of said legs; and
a hole through the second of said legs aligned with said pin;
the pin of each link being inserted into the hole of the other link.

2. A knee-joint coupling according to claim 1 in which said legs are parallel.

3. A knee-joint coupling according to claim 1 in which each link has a hole through its base.

4. A knee-joint coupling according to claim 3 in which said holes are threaded and a screw is threaded through each of said threaded holes into said respective spaces, thereby preventing the links from disassembling.

5. A hinge comprising a knee-joint coupling according to claim 1 and means for attaching the base of one of the links to a door and the base of the other link to another member.

* * * * *